Figure 1:
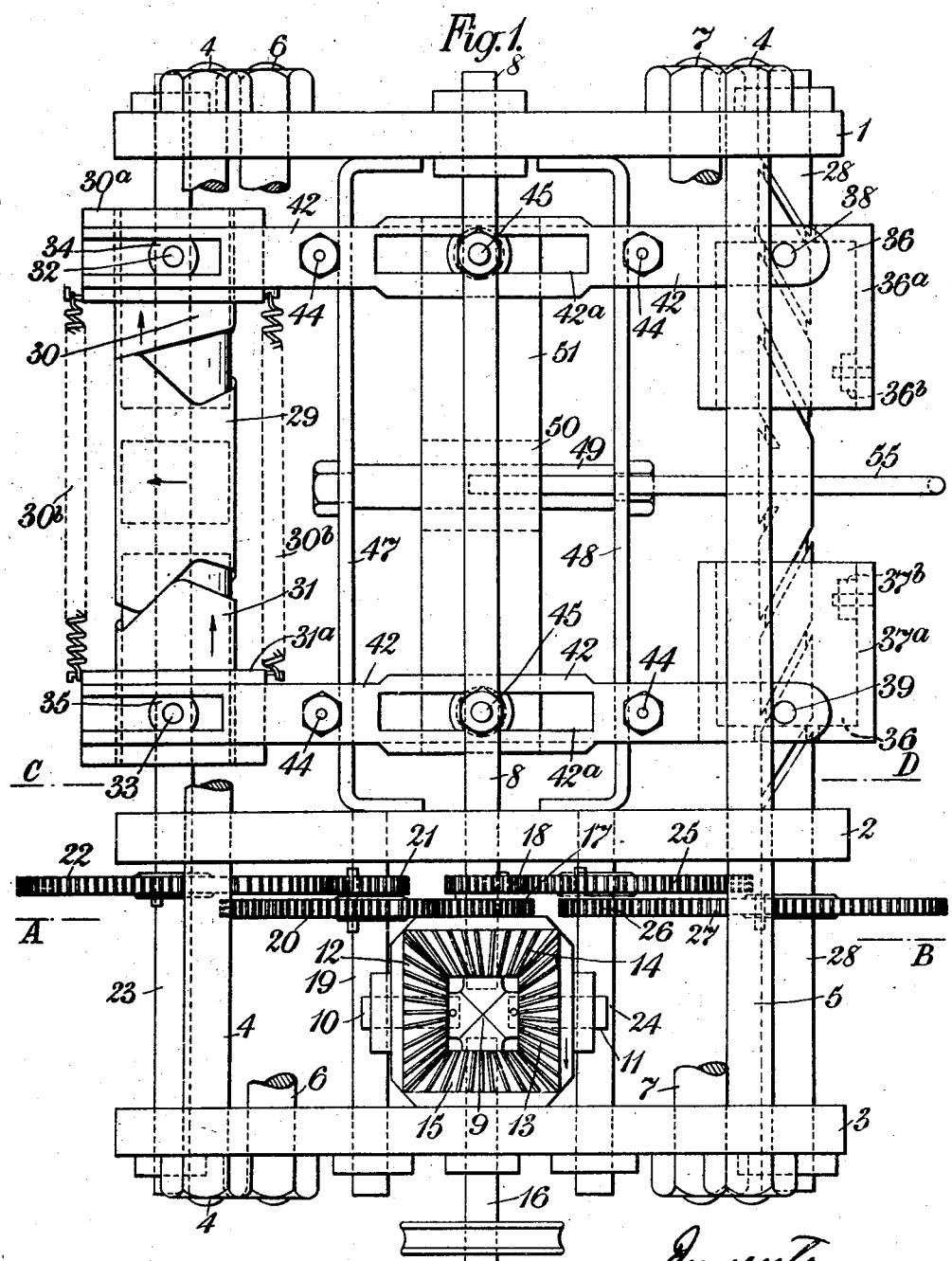

July 1, 1930.   J. C. LAWSON   1,769,847
INFINITELY VARIABLE GEAR
Filed May 7, 1928   2 Sheets-Sheet 1

July 1, 1930.  J. C. LAWSON  1,769,847
INFINITELY VARIABLE GEAR
Filed May 7, 1928  2 Sheets-Sheet 2
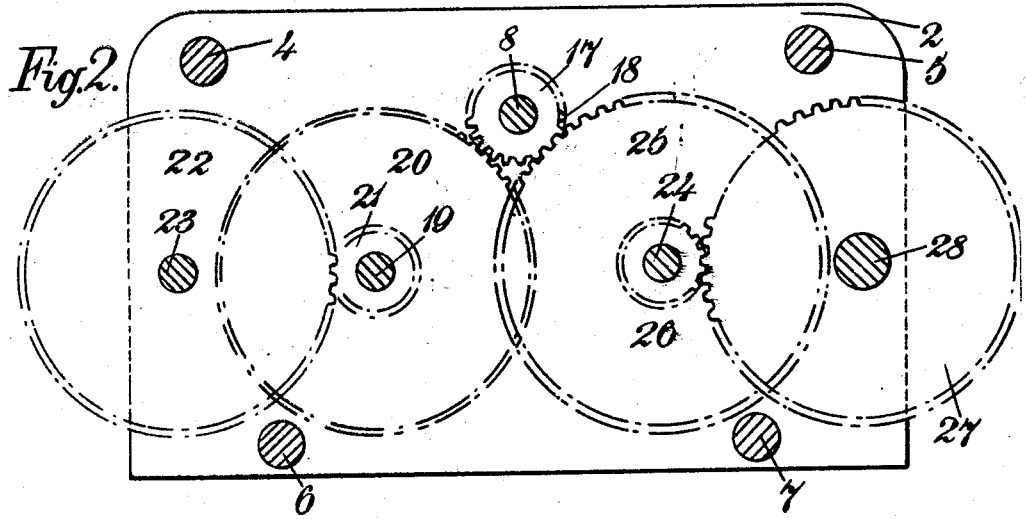
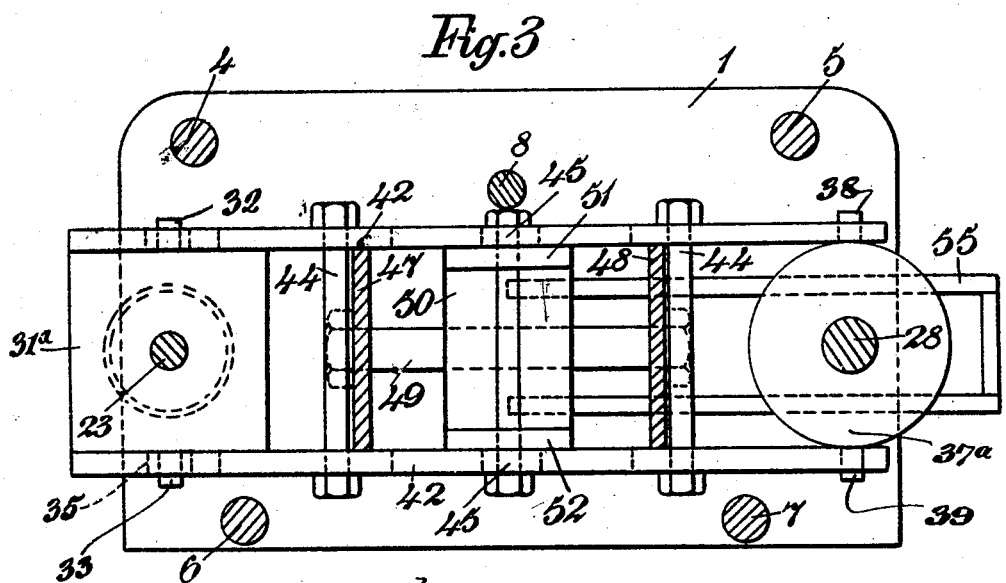
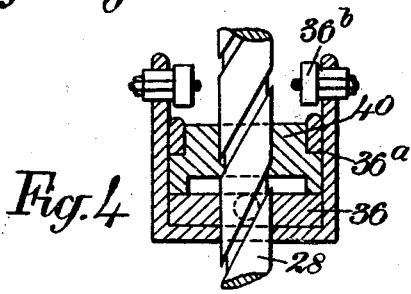
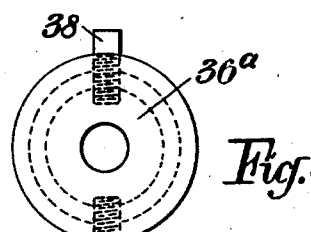

Patented July 1, 1930

1,769,847

UNITED STATES PATENT OFFICE

JOHN CUTHBERT LAWSON, OF ROYSTON, ENGLAND

INFINITELY-VARIABLE GEAR

Application filed May 7, 1928, Serial No. 275,921, and in Great Britain May 11, 1927.

This invention relates to an improved variable speed gear and has for its object to provide means whereby any desired ratio of continuous and uniform transmission within predetermined limits may be obtained.

The device comprises a differential gear system, driving and driven shafts, the former of which shafts actuates one member of the differential, while the other shaft is driven by a second member of the differential, means for controlling the speed permitted to the third member of the differential relatively to the driving shaft in the form of two rotating members with one of which cooperate continuously and uniformly a plurality of reciprocating members of constant travel, and with the other of which cooperate continuously and uniformly a plurality of reciprocating members of variable travel, and means whereby the first set of reciprocating members transmits its continuous movement to the second set of reciprocating members, so that the ratio of their respective travel may be varied.

The device may include a differential gear, to the planet wheels of which the drive of the driving member is directly transmitted, one of the other pinions of the differential, (hereafter called the load pinion) serving to transmit the drive to the driven member. The driving member is geared to a rotating member co-operating with one of the rectilinearly moving members. The fourth pinion of the differential, (hereafter called the controlled pinion) is in gear with a rotating member co-operating with the other rectilinearly moving member, and is allowed to rotate at a speed which is variable at will, whereby the speed of rotation of the load pinion is determined.

One embodiment of the invention is illustrated diagrammatically in the accompanying drawings, in which Fig. 1 is a plan view, Fig. 2 a vertical section on the line A B of Fig. 1, Fig. 3 a vertical section on line C D of Fig. 1, Figs. 4 and 5 are detail views of one of the rectilinearly moving members, being, respectively, a horizontal section and an end view.

In a framework comprising bearing members 1, 2 and 3 held together and suitably spaced by longitudinal members 4, 5, 6 and 7, are mounted the engine-driven shaft 8, cam shaft 23, and spirally grooved shaft 28.

The shaft 8, which is the driving member in the variable speed gear illustrated, has rigidly mounted thereon a cross piece 9 carrying stub shafts 10 and 11, extending at right angles to the length of the shaft 8, and having bevel gears 12 and 13 freely rotatable thereon. A third bevel gear 15, engaging gears 12 and 13, is rigidly mounted on a shaft 16 rotating in bearing member 3 of the frame and having one end extending into a socket in the cross piece 9. The gear 15 is hereafter referred to as the "load pinion", and the shaft 16 is the driven shaft of the speed gear illustrated. A fourth bevel gear 14 also engaging gears 12 and 13 is freely mounted on shaft 8. This gear is hereafter referred to as the "controlled pinion".

Integral with the gear 14 is a gear 17, which engages with a gear 20 driving a shaft 19 journalled in bearing members 2 and 3, which shaft in turn carries keyed thereon a gear 21 engaging with a gear 22 keyed on the cam shaft 23.

The controlled pinion 14, which the bevel gears 12 and 13 tend to rotate when a load is applied to the load pinion 15, being geared as above described to the cam shaft 23, its rate of rotation is determined by that of the latter.

Keyed on the shaft 8 is a gear 18, which engages with a gear 25 keyed on a shaft 24 journalled in bearing members 2 and 3 and carrying keyed thereon a gear 26, which engages with a gear 27 keyed on the spirally grooved shaft 28, so that the driving shaft 8 drives the shaft 28 at a speed in constant relationship with that of shaft 8.

Lying between the shaft 28 and the cam shaft 23 is the mechanism which determines at what speed the cam shaft 23 (and consequently the controlled pinion 14) is allowed to rotate relatively to the constantly driven shaft 28.

Mounted between the bearing members 1 and 2 of the framework are two plates 47, 48, across the centre of which is bolted a connecting and distancing member 49. Slidably mounted on the member 49 is a rectangular block 50, upon the upper and lower surfaces of which respectively are rigidly mounted plates 51 and 52 lying parallel to one another and to the shaft 8. The ends of the plates 51 and 52 are bolted together and distanced by bolts, the ends 45 of which form fulcrum pins for levers 42 extending at right angles to the length of and across the edges of the plates 47 and 48. It will be seen that a member 42 is fulcrumed on either end of plate 51, and on either end of plate 52, and that members 42 which are opposite one another in a vertical plane are bolted together and distanced by bolts 44. The levers 42 engage at their ends, in a manner described below, with elements moving on the screw threaded shaft 28 and the cam shaft 23 respectively. The levers 42 are provided with slots $42^a$ along their central portion so as to fit snugly upon the fulcrum pins 45 or upon antifriction washers or sleeves surrounding said fulcrum pins.

To the rectangular block 50 is attached a draw member 55 which may be in the form of two rods extending laterally across and above and below the spirally grooved shaft 28. By means of this draw member the rectangular block can be moved longitudinally of the member 49 and thus the fulcrum pins 45 can be moved longitudinally of the slots $42^a$ in the levers 42.

On the cam shaft 23 is keyed a cylindrical cam member 29 having at either end cam surfaces adapted to co-operate with corresponding surfaces of sliding cam members 30, 31, which can slide freely on the cam shaft 23, but do not rotate therewith. These sliding members 30, 31 have cam surfaces of similar shape, and are offset a quarter of a circle in respect of their driving surfaces, so that uninterruptedly one or other sliding member is being acted on by the rotating cam 29. The members 30, 31 are provided at their outer ends with square blocks $30^a$ and $31^a$ upon the upper and lower sides of which are mounted pins 32 and 33 that co-operate with the forked ends of the levers 42. Between the pins 32, 33 and the forked ends of the levers 42 are provided rocking pieces 34, 35 to allow of sliding movement between the pins 32, 33 and the ends of the levers. As the cam 29 rotates it pushes the sliding cam members 30, 31 outwards along the shaft 23, while the cam surfaces are rising, but as soon as the cam surfaces begin to drop, the sliding cam members 30, 31 are drawn inwards again by springs $30^b$. It will be seen that the cam shaft 23 can only rotate at a speed which is determined by the rate at which the surfaces of the sliding cams 30, 31 recede before the surfaces of the cam 29.

On the spirally grooved shaft 28 at the other side of the apparatus are mounted hollow cylindrical bodies $36^a$ and $37^a$, the solid bases 36 of which are bored to travel freely on the shaft 28, without engaging with the spiral grooves therein. Projecting upwardly and downwardly from the solid bases 36 are pins 38 and 39 which engage in holes in the ends of the levers 42. Within the hollow portions of the cylindrical bodies $36^a$ and $37^a$, (see Fig. 4) are circular nuts 40, of substantial construction threaded internally to engage with the spiral grooves on the shaft 28. The grooves in the shaft 28 are cut in opposite directions, from near the centre to near the ends of the shaft. It will be seen that although the bodies $36^a$ and $37^a$ are not engaged with the spiral grooves of the shaft 28, nevertheless these bodies cannot move along the shaft 28 toward the middle of the shaft at a greater rate than determined by the circular nuts 40, which engage with the shaft 28, and when the inner side of the bases 36, are in contact with the nuts 40, the friction between them is sufficient to prevent the rotation of the nuts and these latter will only move along the shaft 28 (without rotating thereon) as permitted by the rotation of that shaft.

I have found that sufficient friction between the nuts 40 and the bases 36 is obtained if these parts are made of Babbitt metal. The effect is enhanced by recessing the under side of the nuts 40 so as to limit the contact between the nuts and the bases 36 of the bodies $36^a$, $37^a$ to a circumferential band as shown in Fig. 4. Upon the bodies $36^a$ and $37^a$ being moved back along the shaft 28 in the opposite direction by the sliding cam members 30, 31 moving under the action of the springs $30^b$, the nuts 40 are freed from friction and are withdrawn along the shaft by their outer sides being engaged by rollers $36^b$, $37^b$ mounted within the bodies $36^a$, $37^a$. The operation of the mechanism illustrated is as follows: The shaft 8 is driven by the engine at a given number of revolutions (say 100) and the grooved shaft 28, through the gearing 18, 25, 24, 26 and 27 receives a constant drive at a much lower number of revolutions. The planet pinions 12 and 13 of the differential revolve as a whole and, if the controlled pinion 14 is stationary, the load pinion 15 revolves freely and the driven shaft 16 revolves at twice the speed of the driving shaft 8 (or 200 revolutions). If however there is any load applied to the shaft 16, tending to check its revolution, the pinions 12 and 13 begin to drive the controlled pinion 14, which in turn, through the gearing 17, 20, 19, 21 and 22 drives the cam shaft 23. The latter however, can only rotate by the receding of the sliding cam members 30, 31, and this is regulated by the relative length of the arms of the levers 42 on either side of the fulcra 45. If the arms of the levers 42 are equal, then the sliding cam members 30, 31 will move along shaft 23 at the same speed as the members 36ª, 37ª (held in check by the nuts 40) move along the grooved shaft 28.

If the block 50 is pulled by the control rod 55 towards the grooved shaft 28, the fixed rate of travel of the members 36ª and 37ª on the latter will produce a more rapid travel of the sliding cam members 30, 31 and consequently permit a more rapid revolution of the cam 29 and of the controlled pinion 14, with a consequent drop in the speed of the load pinion 15 and driven shaft 16.

Movement of the block 50 towards the cam shaft 23 will have the reverse effect, slowing down the revolution of the cam 29 and of the control pinion 14, and accelerating the driven shaft 16.

It will be seen that in the construction illustrated the travel of the bodies 36ª, 37ª is at a speed having a fixed relationship to that of the driving shaft 8, but that the extent of their travel is variable. The sliding cam members 30, 31 on the other hand have a fixed extent of travel, but their rate of movement is variable.

It will also be seen that the system comprising the members 37ª, 42 and 31 and the system comprising the members 36ª, 42 and 30 overlap one another in their periods of effective operation, the second system being in effective operation in the position illustrated and the former system returning from being in effective operation.

I claim:

1. Variable speed gear mechanism comprising a rotating member, a plurality of reciprocating members of constant travel co-operating continuously and uniformly with said rotating member, a second rotating member, a plurality of reciprocating members of variable travel on the second rotating member, means cooperating with and providing a continuous and uniform coupling between the reciprocating members of variable travel and the second rotating member, adjustable means for transmitting movement of the first mentioned reciprocating members to the second mentioned reciprocating members with variable transmission ratio, and pairs of interengaging cams imparting a continuous thrust to the first mentioned reciprocating members, one cam of each pair being rotatable while the other cam of each pair is movable longitudinally without rotation.

2. Variable speed gear mechanism comprising a rotating member, a plurality of reciprocating members movable with regard to the rotary member, means fast on the rotating member and cooperating continuously and uniformly with the reciprocating members to impart movement of constant extent thereto, a spirally grooved shaft, a plurality of reciprocating members of variable travel movable longitudinally of the spirally grooved shaft, adjustable means for transmitting movement of the first mentioned reciprocating members to the second mentioned reciprocating members with variable transmission ratio, and a plurality of screw threaded nuts engaged with the spirally grooved rotating shaft and with the reciprocating members movable longitudinally of said shaft, and rotating when moved in one direction on the shaft and held against rotation by engagement with the reciprocating members when moved in the other direction on the shaft.

3. Variable speed gear mechanism comprising a rotating member, a plurality of reciprocating members of constant travel co-operating continuously and uniformly with said rotating member, a second rotating member, a plurality of reciprocating members of variable travel on the said second rotating member, means cooperating with and providing a continuous and uniform coupling between the reciprocating members of variable travel and the second rotating member, a plurality of pivoted levers transmitting movement of the first mentioned reciprocating members to the second mentioned reciprocating members, means for moving the pivots of said levers longitudinally of the levers to vary the ratio of travel of the two sets of reciprocating members, and pairs of interengaging cams imparting a continuous thrust to the first mentioned reciprocating members, one cam of each pair being rotatable while the other cam of each pair is movable longitudinally without rotation.

4. Variable speed gear mechanism comprising a rotating member, a plurality of reciprocating members, movable with regard to the rotary member, means fast on the rotating member and cooperating continuously and uniformly with the reciprocating members to impart movement of constant extent thereto, a spirally grooved shaft, a plurality of reciprocating members of variable travel adapted to move longitudinally of the spirally grooved shaft, a plurality of pivoted levers transmitting movement of the first mentioned reciprocating members to the second mentioned reciprocating members, means for moving the pivots of said levers longitudinally of the levers to vary the ratio of travel of the two sets of reciprocating members, and a plurality of screw threaded nuts engaged with the spirally grooved shaft and with the reciprocating members on said shaft, and adapted to rotate when moved in one direction on the shaft and to be held against rotation by engagement with said reciprocating members when moved in the other direction on the shaft.

In testimony whereof I have signed my name to this specification.

JOHN CUTHBERT LAWSON.